(12) United States Patent
Maeshima et al.

(10) Patent No.: US 6,211,909 B1
(45) Date of Patent: Apr. 3, 2001

(54) CAMERA AND EQUIPMENT THEREFOR

(75) Inventors: Yoshihiro Maeshima; Kazuki Itoh; Urato Aruga; Hideo Nakamura, all of Suwa (JP)

(73) Assignee: Chinon Kabushiki Kaisha, Nagano (JP)

( * ) Notice: Subject to any disclaimer, the term of this patent is extended or adjusted under 35 U.S.C. 154(b) by 0 days.

(21) Appl. No.: 08/792,994

(22) Filed: Feb. 3, 1997

(30) Foreign Application Priority Data

Feb. 21, 1996 (JP) .................................................. 8-033858

(51) Int. Cl.⁷ .................................................. H04N 5/225
(52) U.S. Cl. ...................... 348/207; 348/231; 348/333.04
(58) Field of Search .................................. 348/207, 220, 348/221, 231, 232, 233, 370, 371, 333, 334, 33.01, 333.02, 333.04; H04N 5/225

(56) References Cited

U.S. PATENT DOCUMENTS

| | | | |
|---|---|---|---|
| 4,746,993 | * 5/1988 | Tada | 348/220 |
| 5,633,976 | * 5/1997 | Ogino | 348/231 |
| 5,852,467 | * 12/1998 | Ogino | 348/231 |

FOREIGN PATENT DOCUMENTS

| | | |
|---|---|---|
| 62-113338 | 7/1987 | (JP) . |
| 1-211106 | 8/1989 | (JP) . |
| 6-269066 | 9/1994 | (JP) . |

* cited by examiner

Primary Examiner—Tuan Ho
(74) Attorney, Agent, or Firm—Hickman Coleman & Hughes, LLP

(57) ABSTRACT

This camera has a plurality of light-emitting devices such as LED, which flicker in response to the number of shots which can be photographed. Also, while having no liquid crystal display for showing an error when it occurs, this camera has a non-volatile memory for writing an error code. When the camera is connected to a computer, the error code can be displayed on the computer screen.

2 Claims, 10 Drawing Sheets

Fig. 14

| DEFINITION | EMITTED LED | OPERATION |
|---|---|---|
| LED=0 | RED | ON |
| LED=1 | RED | FLICKER |
| LED=2 | RED | FLICKER |
| LED=3 | RED | FLICKER |
| LED=4 | RED | OFF |
| LED=5 | RED  GREEN  YELLOW | 3 COLORS FLICKER TOGETHER |
| LED=6 | YELLOW | ON |
| LED=7 | GREEN | ON |
| LED=8 | GREEN | FLICKER |

CAMERA AND EQUIPMENT THEREFOR

BACKGROUND OF THE INVENTION

1. Field of the Invention

The present invention relates to a camera such as digital camera or video camera and, in particular, to an electronic still camera equipped with a storage device such as a semiconductor memory which stores image data of subjects.

2. Related Background Art

The conventional electronic still camera has a liquid crystal display (LCD) for notifying various kinds of information to its user. Normally installed within the camera are a custom LCD panel and an LCD driver for driving the LCD. A microcomputer within the camera notifies various kinds of display information to the LCD driver and controls a semiconductor chip which performs processing of the subject image data.

SUMMARY OF THE INVENTION

Since the custom LCD panel, the LCD driver, and the image processing chip are not of general purpose, they increase the initial cost of the product. When the image processing is realized by means of software in order to reduce the cost of the product, this processing occupies the CPU or MCU for a longer time. Accordingly, when such a processing is performed, the LCD cannot be driven at a high speed so as to instantaneously notify various kinds of information to the user.

The present invention relates to a camera such as digital camera or video camera. The camera of the present invention comprises a storage device which can store a predetermined amount of image data, the image data being arranged in blocks corresponding to camera shot; a light-emitting diode which emits visible radiation; and a control unit which, based on information about an available image data storage space on the storage device, controls the visible radiation emitted by the light-emitting diode. The light-emitting diode is controlled by the control unit so as to emit a number of pulses of visible radiation in a predetermined period, the number of the pulses representing the number of blocks that may be stored in the storage device, provided that the pulses are generated when the number of available blocks is one, two or three. The number blocks of storable image data coincides with the number of image shots which can be photographed.

As the storage device, a semiconductor non-volatile memory such as EPROM or $E^2$PROM can be used. An example of the control unit is a microcomputer equipped with a central processing unit.

Also, a camera having a storage device, which is driven by an electric power supplied from a battery, and a control unit for controlling the storage device may further comprise at least three light-emitting diodes each of which emits a visible radiation, while the control unit may regulate the emission of the light-emitting diodes on the basis of operational states of the battery, storage device, and control unit. The control unit can simultaneously flicker the three light-emitting diodes when an error is detected in the camera.

An image of the subject is captured by a solid-state imaging device, and image data of the subject captured by this solid-state imaging device are stored into the storage device without image processing. An error code corresponding to an error which occurs at the time when the image data are stored is written into a first non-volatile memory. The camera further comprises therewithin a second non-volatile memory which can store the error code; while the control unit detects the error which has occurred at the time when the image data are stored, reads out from the first non-volatile memory the error code corresponding to thus occurred error, and writes thus read-out error code into the second non-volatile memory.

These cameras can be connected to a computer by way of a detachable cable or the like. This computer performs at least one of white-balance adjustment, gamma correction, edge enhancement, and contrast adjustment of the image data read out from the storage device.

Stored in an equipment is a program which can be read out by the computer connectable to the camera and includes an instruction for controlling an operation of the computer when the program is installed into the computer. The program stored in this equipment is installed into the computer, which then performs, according to the instruction, a processing for reading out the error code stored in the second non-volatile memory. Also, this camera comprises a terminal for connecting the camera to the computer which can read out the error code stored in the second non-volatile memory.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 14 is a chart showing emission patterns of light-emitting diodes; and

DESCRIPTION OF THE PREFERRED EMBODIMENTS

In the following, an embodiment of the camera in accordance with the present invention will be explained. In the explanation, constituents identical to each other will be referred to with marks identical to each other without their overlapping explanations repeated. Here, words "upper" and "lower" respectively correspond to the upper and lower positions of the drawings unless otherwise specified.

First, the outer configuration of the camera will be explained.

Figure 1:
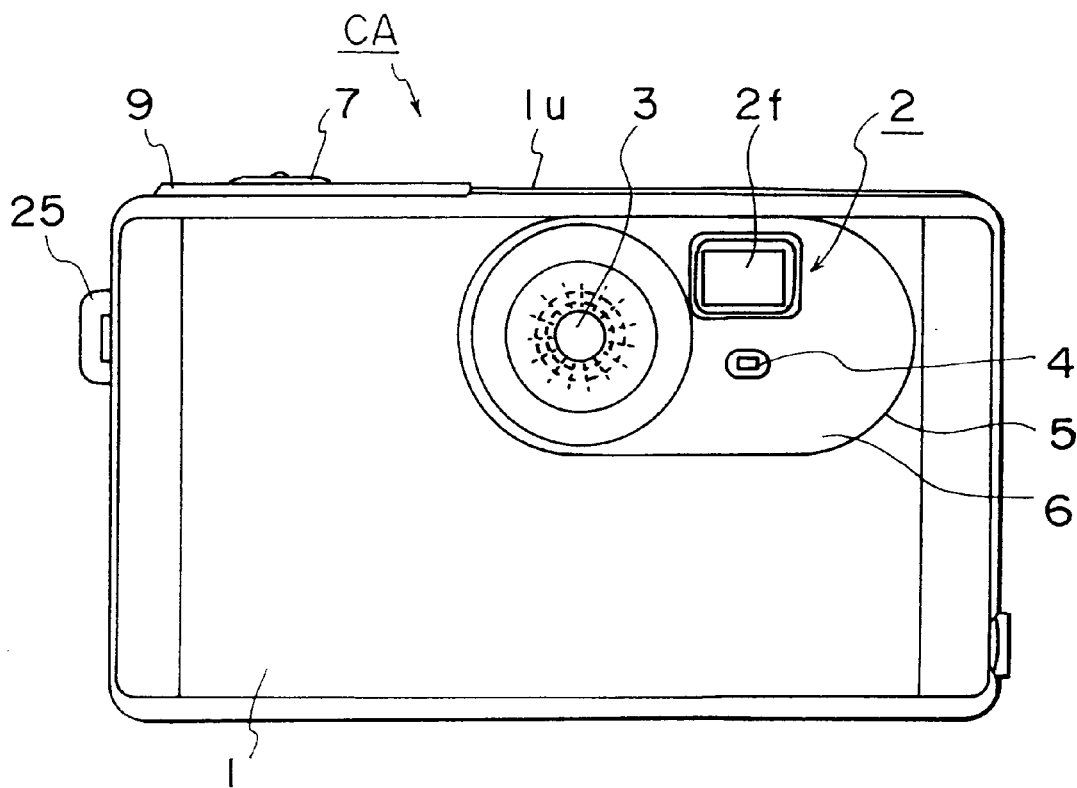
FIG. 1 is a front view of a camera.

FIG. 1 is a front view of a camera CA in which, on the front face of a housing 1, a transparent front plate 2f of a see-through finder 2 and a photographing lens 3 are disposed. The transparent plate 2f is positioned near the photographing lens 3, thereby reducing a parallax which occurs due to the difference between the real picture captured through the photographing lens 3 and the visual field of the finder 2. Here, this parallax may also be corrected by an automatic parallax-correction system. Also, disposed near the photographing lens 3 is an exposure meter 4 for measuring the quantity of incident light. This exposure meter 4 comprises a photoconductor such as cadmium sulfide (CdS) which changes its electric resistance value in response to the incident light.

These devices 2, 3, and 4 with light-receiving functions are disposed within a region 6 surrounded by a step 5 on the front face of the housing 1. A user of the camera CA holds the latter by attaching a finger to part of the front face of the housing 1. At this moment, when a contact surface of the user's finger to the front face of the camera CA extends across the step 5, the user's finger can detect the step 5. Accordingly, when the user detects the step 5 and then relocates the finger holding the camera to the outside of the region 6, the light-receiving functional devices 2, 3, and 4 disposed within the region 6 are prevented from being covered with the user's finger. Since the photographing lens (including its body part) 3 is a particularly important device for photographing an image of a subject, it is protruded from the front face of the housing 1 by about several millimeters so that the user can easily detect the position thereof.

On an upper face 1u of the housing 1, a shutter release button 7 is disposed. The release button 7 is protruded from the upper face 1u of the housing 1 toward the outside of the camera CA by about several millimeters. The release button 7 is positioned on the right side of the camera CA and can be pushed down by the index finger of the user's right hand. When the release button 7 is pushed down, an image of a subject incident on the inside of the camera CA by way of the objective lens 3 is stored into a storage device disposed within the camera CA, which will be explained later.

Figure 2:
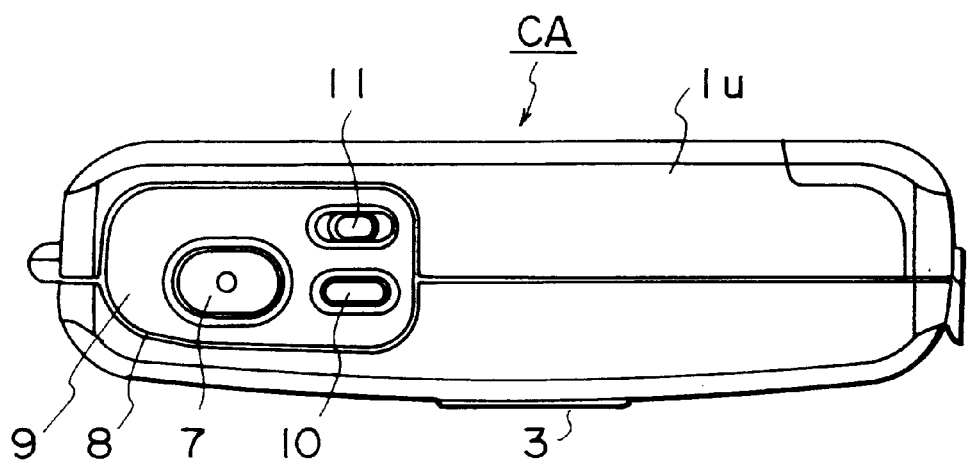
FIG. 2 is a plan view of the camera.

FIG. 2 is a plan view of the camera CA, in which the release button 7 is disposed within a region 9 surrounded by a step 8 within the upper face 1u of the camera CA. Within the region 9, a main switch button 10 and an erase switch button 11 are disposed. When the main switch button 10 is pushed down once in a state where the electric power is not turned on after a battery is installed into the camera, electric devices within the camera are actuated so as to attain a state which enables photographing. Also, when the main switch 10 is pushed down once in a state where the electric power is turned on, the devices which have been electrically actuated within the camera are shut down. When the erase switch button 11 is pushed down, the image data recorded in the storage device are erased and, while the image data are being erased, the other functions within the camera are interrupted.

Figure 3:
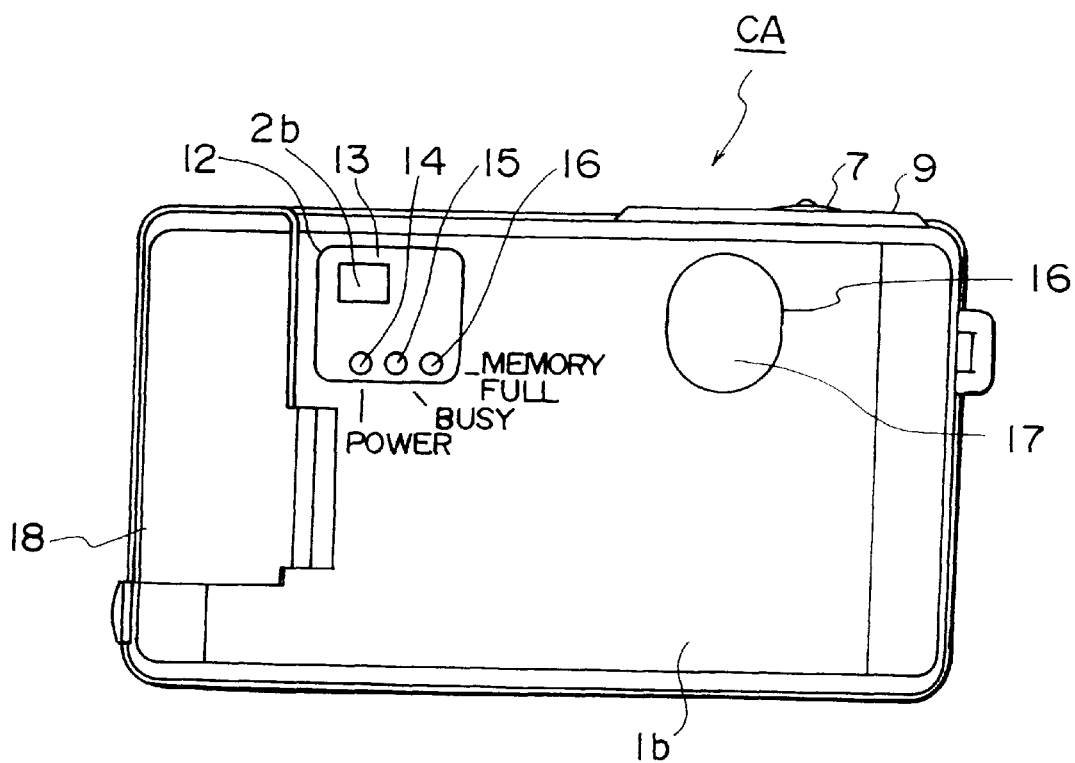
FIG. 3 is a rear view of the camera.

FIG. 3 is a rear view of the camera CA, in which a region 13 surrounded by a step 12 is formed on a back face 1b of the housing 1. Within the region 13, a back plate 2b of the finder 2 is disposed. Also, within this region 13, three light-emitting diodes 14, 15, and 16 each of which emits a visible radiation are disposed as being arranged in a single row. The luminescent colors of the diodes 14, 15, and 16 are green, yellow, and red, respectively. Information about the state of the camera necessary for photographing the subject is notified to the user by way of these light-emitting diodes 14, 15, and 16 alone. Here, the light-emitting diodes 14, 15, and 16 are disposed below the finder 2. When photographing a subject, users normally bring their eyes close to the finder 2. Accordingly, the users inevitably perceive the light-emitting diodes 14, 15, and 16 disposed within the region 13, thereby naturally recognizing the information about the state of this camera.

On the back face 1b of the housing 1 near the release button 7, formed is a concave region (cavity) 17 surrounded by a step 16. This concave region 17 is formed at a position to which the right thumb abuts when the right index finger is placed on the release button 7. Here, disposed on the side of the back face 1b of the housing 1 opposite to the concave region 17 is a battery box lid 18.

Figure 4:
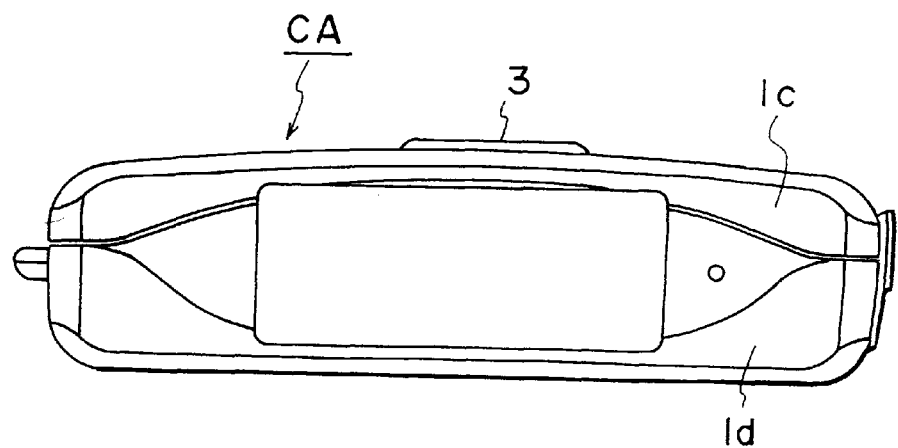
FIG. 4 is a bottom plan view of the camera.

FIG. 4 is a bottom plan view of the camera CA, in which the housing 1 is slightly curved like a bow such that the back face side is dented. The housing 1 is formed as two cases 1c and 1d each having a cavity are assembled together such that their end faces oppose each other. The functional devices of the camera are supported by inner faces of these cases, whereas parts of the respective end faces of the cases are exposed to the bottom face.

Figure 5:
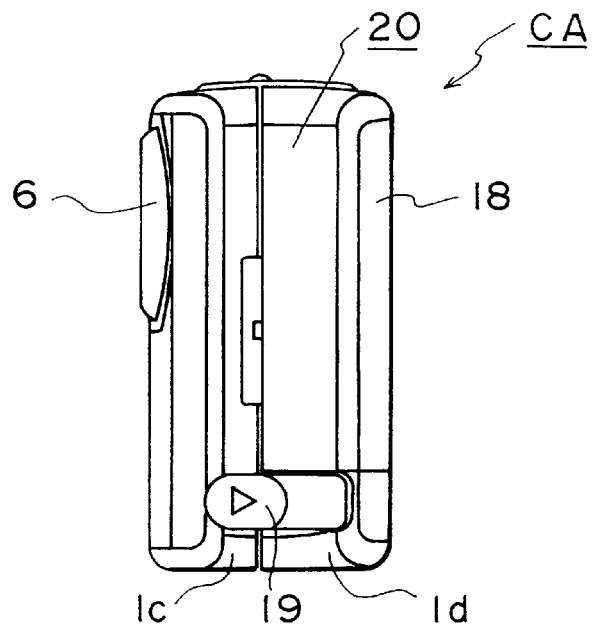
FIG. 5 is a right-side view of the camera.

FIG. 5 is a right-side view of the camera CA (or a left-side view of the camera as seen by a user looking into the finder), in which a flexible member 19 is formed on a left side face 20 of the camera CA. This flexible member 19 extends across the joining surfaces of the two cases 1c and 1d. The flexible member 19 is made of a rubber material.

Figure 6:
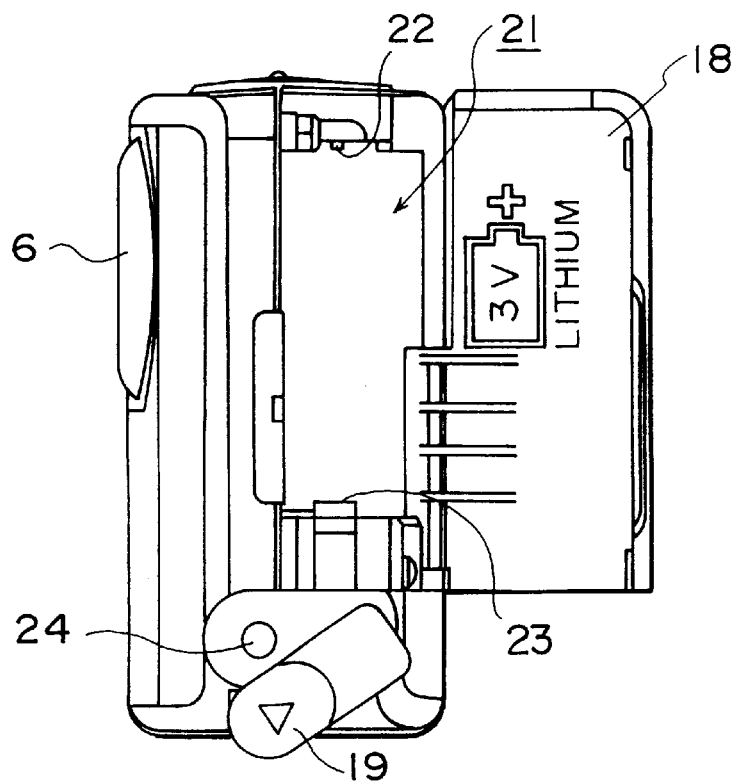
FIG. 6 is a right-side view of the camera with its battery case open.

FIG. 6 is a right-side view of the camera CA of FIG. 5 when the inside of a battery box 21 and a terminal 24 below the flexible member 19 are exposed. An anode terminal 22 is disposed at the upper portion in the inner face of the battery box 21, whereas a cathode terminal 23 is located at the lower portion of the inner face. The battery disposed within the battery box 21 is a three-volt lithium battery. Near the joining portion of the cases 1c and 1d, disposed is the terminal 24 for connecting the camera CA to an external host computer. This terminal 24 is positioned directly below the flexible member 19.

Figure 7:
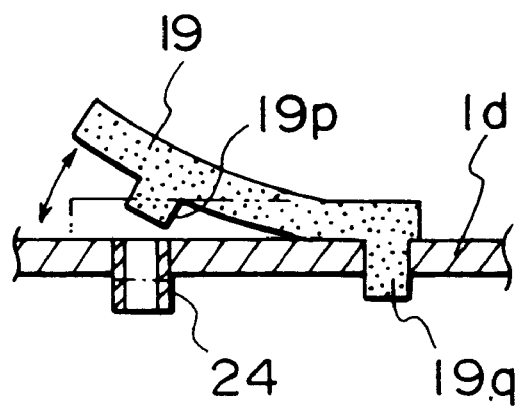
FIG. 7 is an explanatory view of a flexible member.

FIG. 7 is a view for explaining an operation of the flexible member 19. Disposed on the rear side of one end portion of the flexible member 19 in its longitudinal direction is a convex portion 19q protruded toward the housing 1. Also, disposed on the rear side of the other end portion of the flexible member 19 in the longitudinal direction is a convex portion 19p protruded toward the housing 1. The convex portion 19q at one end of the flexible member 19 is fixed to the case 1d, whereas the convex portion 19p at the other end is fitted into the pin jack terminal 24. This protruded portion 19p at the other end can be pulled out of the jack 24 when the flexible member 19 is bent toward the outside of the camera while being rotatable, in parallel to the side face, around the convex portion 19q at one end. As a result, the jack 24 can be exposed.

Figure 8:
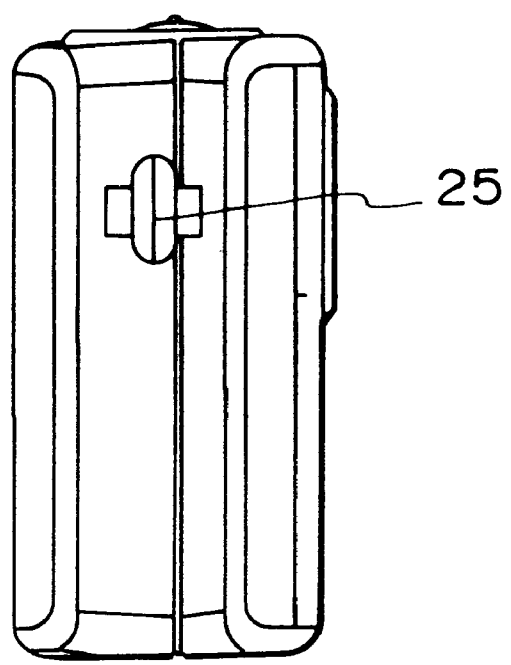
FIG. 8 is a left-side view of the camera.

FIG. 8 is a left-side view of the camera CA. Disposed on the left side face is a member 25 having a belt-inserting opening.

In the following, a system within the camera will be explained.

Figure 9:
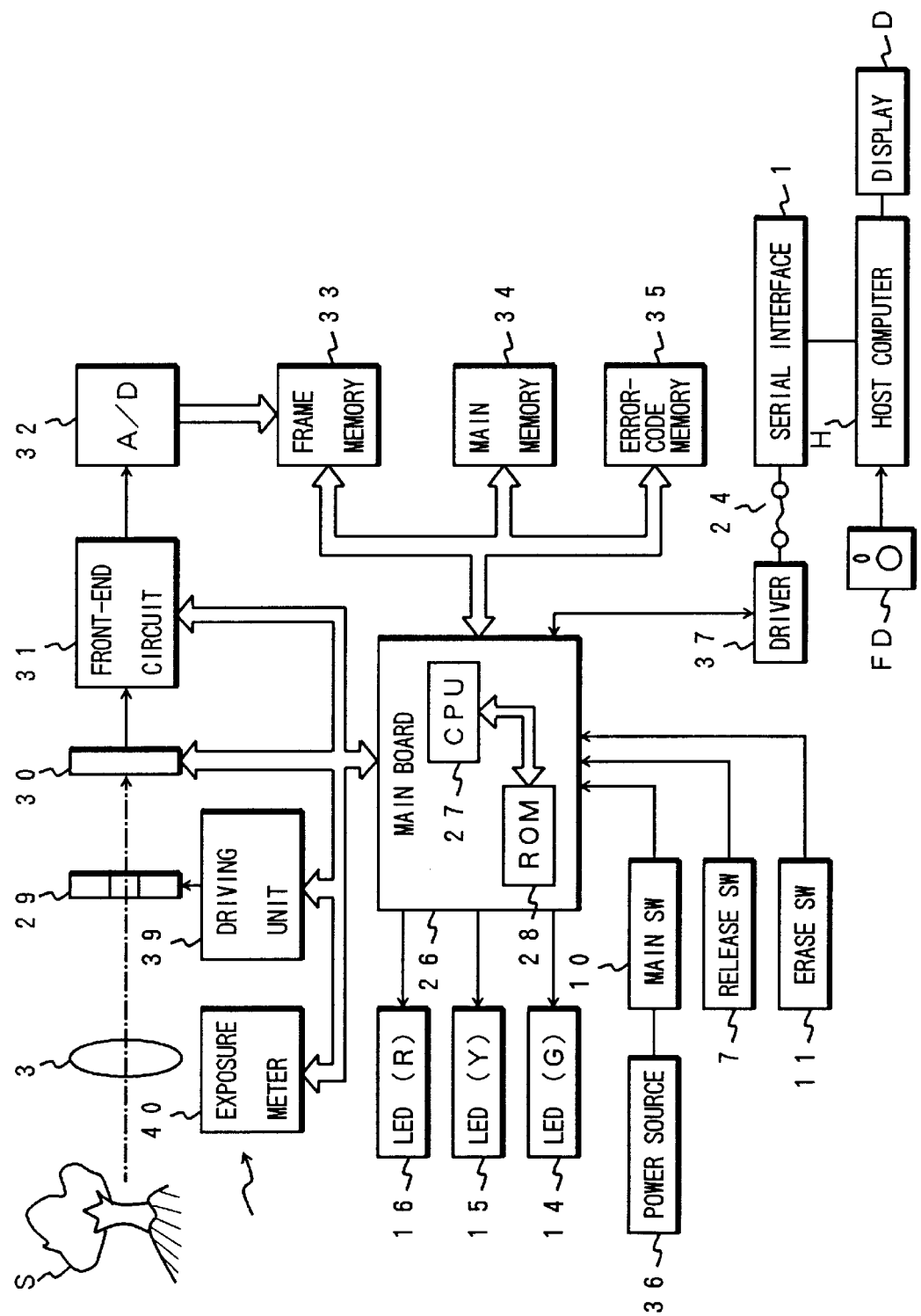
FIG. 9 is a block diagram for explaining a system configuration of the camera.

FIG. 9 is a view showing a system configuration of the camera CA. The camera CA is controlled by a control unit 26 which is constituted by a main board. Namely, the control unit 26 is a microcomputer unit, which comprises a central processing unit (CPU) 27 for performing arithmetic operations and a read-only memory (ROM) 28 storing a program used when the CPU is actuated or the like. Here, the devices within the camera are connected to the control unit 26 by way of a non-depicted interface.

Light reflected by a subject S can be transmitted through the photographing lens 2 and a stop 29 so as to be made incident on the inside of a single-plate color CCD image sensor 30. Namely, an image of the subject S is formed on a light-receiving surface of the image sensor 30. Here, the image sensor 30 includes a CCD composed of a plurality of pixels which are arranged two-dimensionally and a circuit applying a transfer clock to each pixel. The CCD output signal which is output from the image sensor 30 is converted into a video signal by a front-end circuit 31 including an amplifier circuit and a sample holding circuit, and this video signal is converted into a quantized digital signal by an AD converter 32.

Normally, of luminance signal Y and color signal C, the data quantity of the former is in proportion to the number of pixels. Here, when the luminance signal Y and the color signal C are separated from each other, not only the data of the luminance signal Y but also each of data quantities of signals R-Y and B-Y, which are so-called difference signals, increases in proportion to ½ of the number of pixels, thereby becoming twice as large as the initial data quantity thereof. Further, when these data are to be derived from interpolation, the initial data quantity increases threefold while the data quantity storable in a storage device becomes ⅓, thereby making the image data redundant.

Therefore, in this camera, the video signal is directly AD-converted and then stored in a frame memory which can accumulate image data for at least one picture (one camera shot defined by one block). Namely, the image data stored in the frame memory 33 have not been subjected to processings such as white balance adjustment, gamma correction, edge enhancement, and contrast adjustment. That is, without the image data of CCD being processed within the camera, all the image processings are effected in a host computer H. Accordingly, the redundancy of the image data which may be generated when the image processing is effected on the camera side can be prevented from occurring, thereby minimizing the memory size or area needed for storing the image data. Further, since there is no image processing circuit per se, the number of items needed for the memories and circuits can be greatly reduced, and the processing time needed when an image is photographed can be shortened.

Here, as the CCD solid-state imaging device within the image sensor 30, a CCD for VTR is used. While the aspect ratio of the light-receiving surface in the CCD for VTR is 3:4, the aspect ratio of the pixel matrix in terms of the number of pixels is not 3:4 since the spacing between the pixels in the vertical direction differs from that in the horizontal direction. Accordingly, since this camera has no image processing circuit, a warped image is shown on a display D when the image data from the CCD for VTR are input into the host computer H. Therefore, the host computer H subjects the input image data to a pixel interpolation processing so as to make the aspect ratio of the pixel matrix in terms of the number of pixels coincide with the aspect ratio of the light-receiving surface.

The frame memory 33 is controlled by the control unit 26. The frame memory 33 is a so-called PSRAM which apparently functions as static random access memory (SRAM). The image temporarily stored in the frame memory 33 is written into a main memory 34 according to an order from the control unit 26. Here, at this moment, the image data may be written into the main memory 34 as being compressed. The main memory 34 is a non-volatile memory which has a predetermined storage size, allowing both readout and writing. Specifically, it is an electrically erasable programmable ROM ($E^2$PROM) which can erase the voltage at its floating gate when a voltage is applied to its control gate.

The main board 26 includes a communication circuit for exchanging data with the host computer H. This communication circuit is connected to the connector 24, which is of RS232C type, by way of a driver 37 for communications. The host computer H can read out, by way of a serial interface I, the image data stored in the main memory 34, so as to make the display D show the image of the subject S. Here, based on the environmental light quantity detected by the exposure meter 40, the control unit 26 regulates a driving unit so as to drive the stop 29.

The camera CA comprises the three LEDs 14, 15, and 16 as well as an error-code memory 35. In order to inform the user about states of instruments, the control unit causes the LEDs 14, 15, and 16 to emit light. Here, the camera CA is driven by an electric power supplied from a battery (power source) 36 accommodated in the battery box 21.

FIG. 14 is a chart showing emission patterns of the LEDs 14, 15, and 16. In FIG. 14, the row of definition "LED=0" refers to a state where the red-emitting diode continuously emits light when there is no available space on the main memory 34 which can store image data. Definitions of LED=1, 2, . . . , 8 are made similarly thereto. In this chart, "ON" refers to a state where light is continuously emitted.

FIGS. 15A to 15I are timing charts respectively showing emission timings of the LEDs in the cases of LED=0, 1, 2, . . . , 8 shown in FIG. 14.

In the following explanation for flow charts, FIGS. 14 and 15A to 15I will be referred to when appropriate.

Figure 10:
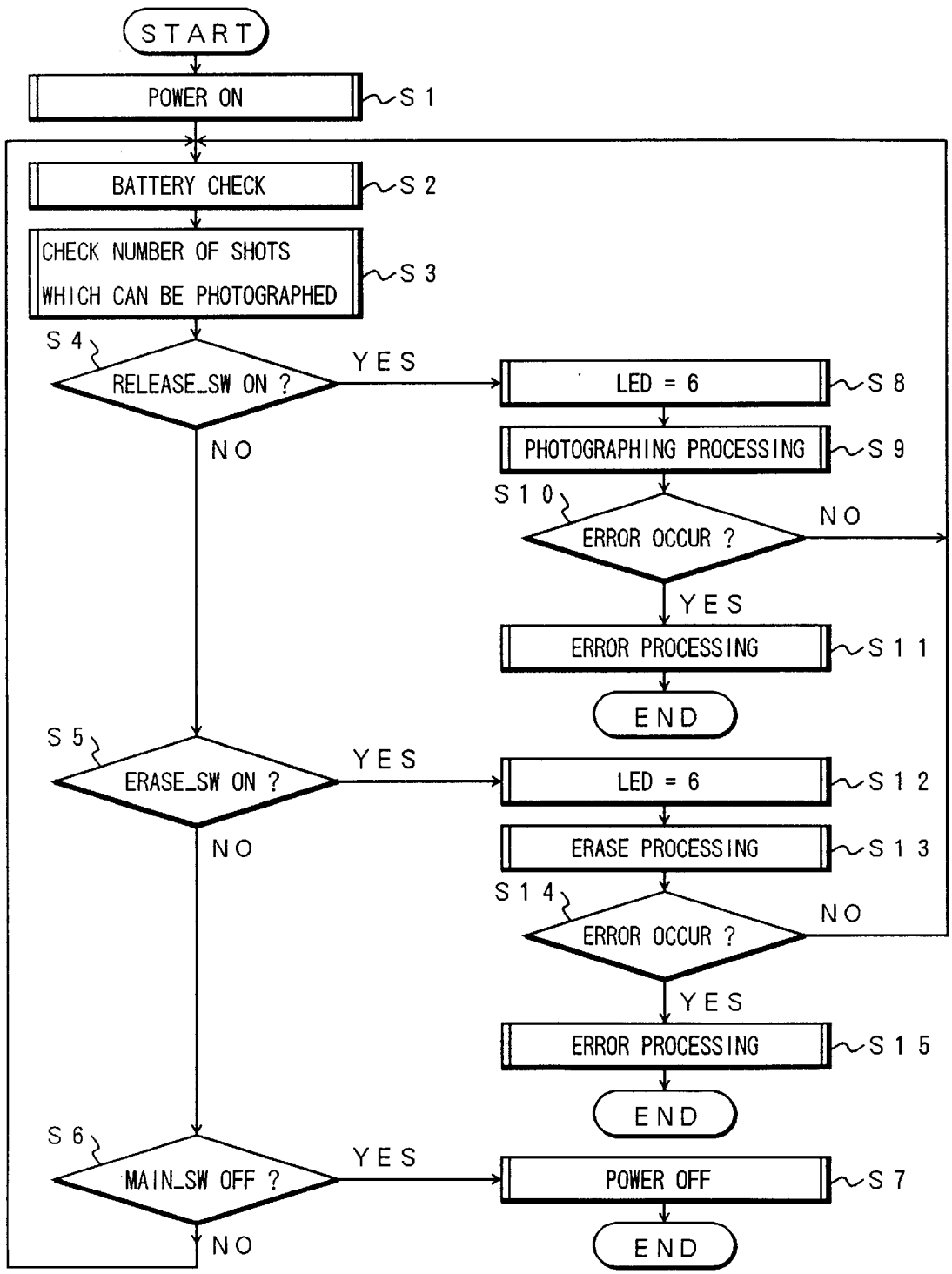
FIG. 10 is a flow chart for explaining an operation of the camera.

FIG. 10 is a flow chart showing a main routine of a camera operation. When the main switch button 10 is pushed down in a state where the power source is not turned on after the battery 36 is installed into the battery box 21, the power source 36 is turned on, so as to actuate the control unit 26 and each of the devices (S1). The CPU 27 of the control unit 26 is actuated according to the actuation program stored in the ROM 28.

Figure 11:
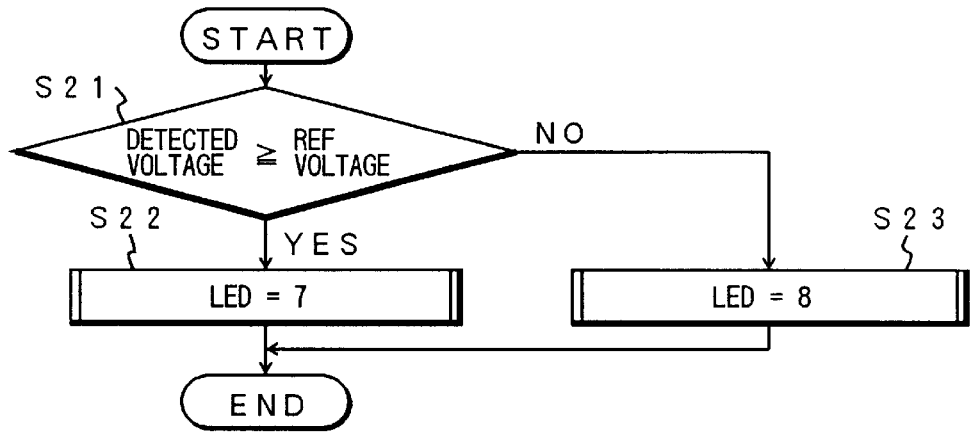
FIG. 11 is a flow chart for explaining an operation of the camera.
Figure 15A:
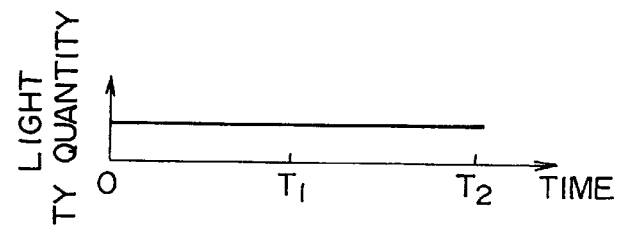
FIGS. 15A to 15I are timing charts for explaining flickering operations of the LEDs.
Figure 15B:
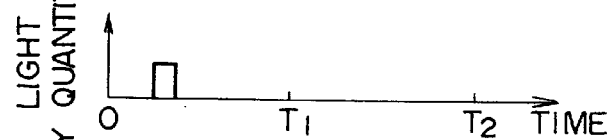
Figure 15C:
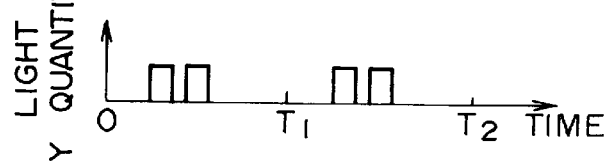
Figure 15D:
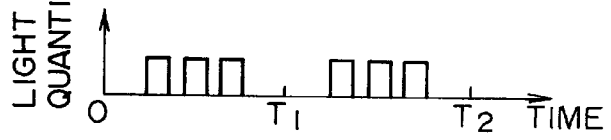
Figure 15E:
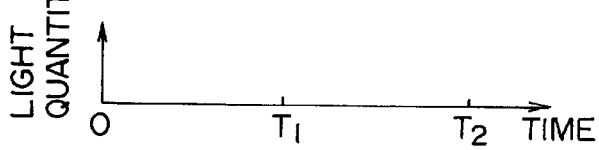
Figure 15F:
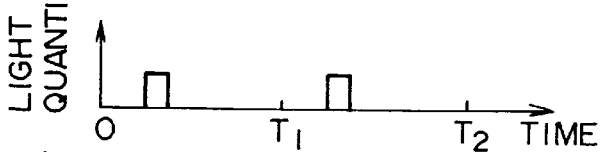
Figure 15G:
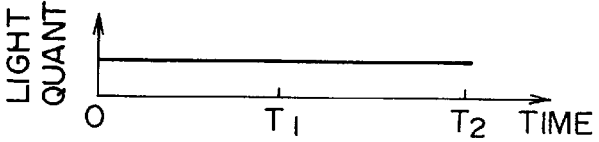
Figure 15H:
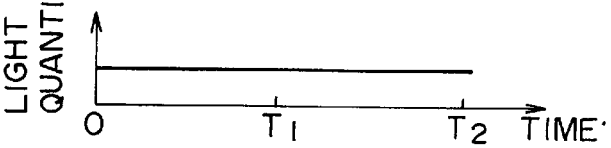

The control unit 26 includes a power-source voltage checking circuit (not depicted) and judges the battery voltage (S2). At this step, as seen from the flow chart of FIG. 11, the power-source voltage checking circuit compares its detected power-source voltage with a reference voltage (S21). When the detected power-source voltage is not lower than the reference voltage, the control unit 26 performs the operation of LED=7 shown in FIG. 14. Namely, as shown in FIG. 15H, it causes the green LED 14 to continuously emit light (S22).

Figure 15I:
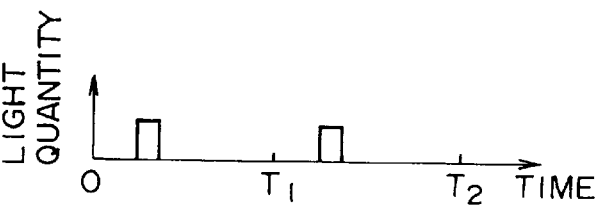

When the detected power-source voltage is lower than the reference voltage, as shown by LED=8 in FIG. 14, the control unit 26 makes the green LED 14 flicker (S23). Namely, as shown in FIG. 15I, it causes the green LED 14 to emit light once during the period from time 0 to time $T_1$ and once during the period from $T_1$ to time $T_2$. It is needless to mention, however, that the LED 14 does not emit light when the battery voltage is lower than the light-emitting threshold voltage of the LED 14 (or in the state where the battery is dead). Here, the emission of LED is regulated by the control unit 26.

After the battery check (S2), the control unit 26 checks the number of shots which can be photographed (S3).

Figure 12:
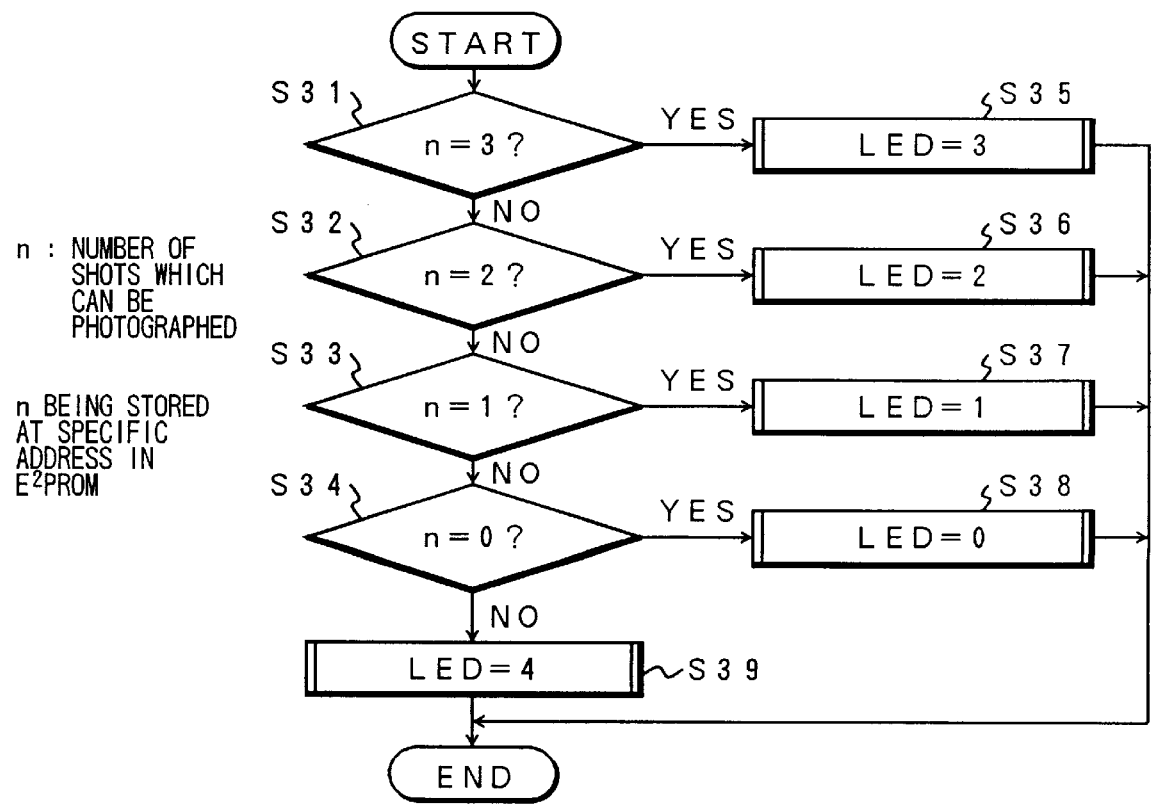
FIG. 12 is a flow chart for explaining an operation of the camera.

FIG. 12 shows a routine of a processing for checking the number of shots which can be photographed. The control unit 26 detects the available space within the main memory 34 which can store image data, and inspects information about the value obtained when this available space is divided by a size of the image data per shot, namely, how many shots each having a predetermined size of image data can be stored within the main memory 34.

First, as shown in FIG. 12, the control unit 26 judges whether the number (n) of storable shots of image data is three or not (S31). Note that n is the number of shots which can be photographed, and n is stored at specific address in $E^2$PROM. When the number of storable shots (blocks) of image data is three, the control unit 26 performs the operation indicated by LED=3 in FIG. 14. Namely, as shown in FIG. 15D, it causes the red LED 16 to flicker three times during the period from time 0 to time $T_1$ and three times during the period from time $T_1$ to time $T_2$, and thereafter repeats this flickering operation (S35).

Then, as shown in FIG. 12, the control unit 26 judges whether the number of storable shots of image data is two or not (S32). When the number of storable shots of image data is two, the control unit 26 performs the operation indicated by LED=2 in FIG. 14. Namely, as shown in FIG. 15C, it causes the red LED 16 to flicker twice during the period from time 0 to time $T_1$ and twice during the period from time $T_1$ to time $T_2$, and thereafter repeats this flickering operation (S36).

Subsequently, as shown in FIG. 12, the control unit 26 judges whether the number of storable shots of image data is one or not (S33). When the number of storable shots of image data is one, the control unit 26 performs the operation indicated by LED=1 in FIG. 14. Namely, as shown in FIG. 15B, it causes the red LED 16 to flicker once during the period from time 0 to time $T_2$, and thereafter repeats this flickering operation (S37).

Then, as shown in FIG. 12, the control unit 26 judges whether the number of storable shots of image data is zero or not (S34). When the number of storable shots of image data is zero, the control unit 26 performs the operation indicated by LED=0 in FIG. 14. Namely, as shown in FIG. 15A, it causes the red LED 16 to continuously emit light (S38).

When the control unit 26 judges that the number of storable shots of image data is not zero at step 34 (S34), it judges that the number of storable shots of image data is at least four (S39) and then performs the operation indicated by LED=4 in FIG. 14. Namely, when the number of storable shots of image data is four or greater, the control unit 26 prevents the red LED 16 from emitting light as shown in FIG. 15E (S39).

After checking the number of shots which can be photographed (S3), the control unit 26 detects whether the release switch 7 is turned on or not (S4). When the release switch 7 is not pushed down, the control unit 26 detects whether the erase switch 11 is turned on or not (S5). Further, when the erase switch 11 is not pushed down, the control unit 26 detects whether the main switch 10 is pushed down or not (S6). When the main switch 10 is not pushed down either, the control unit 26 repeats the sensing operations from S2 to S6; whereas it turns off the power source of the camera when the main switch 10 is pushed down (S7).

When the respective switches are pushed down at the sensing steps (S4 and S5), the control unit 26 performs the following control operations.

First, when the release button (switch) 7 is pushed down at judging step 4 (S4), the control unit 26 performs the operation indicated by LED=6 in FIG. 14. Namely, as shown in FIG. 15G, the control unit 26 makes the yellow LED 15 continuously emit light (S8), and performs a photographing processing (S9).

The photographing processing is as follows. First, based on the light quantity data output from the exposure meter 40, the control unit 26 judges whether this light quantity is appropriate or not, i.e., greater than a threshold level which is necessary for photographing or not. When the measured light quantity exceeds the threshold level, photographing can be effected. Accordingly, based on the measured light quantity, the control unit 26 outputs a control signal to the driving unit 39 which controls the stop 29, thereby adjusting the stop 29. When the detected light quantity is not greater than the threshold level, the operation shifts to an error mode, in which, at the subsequent error-generation judging step (S10), an error processing is effected (S11).

Figure 13:
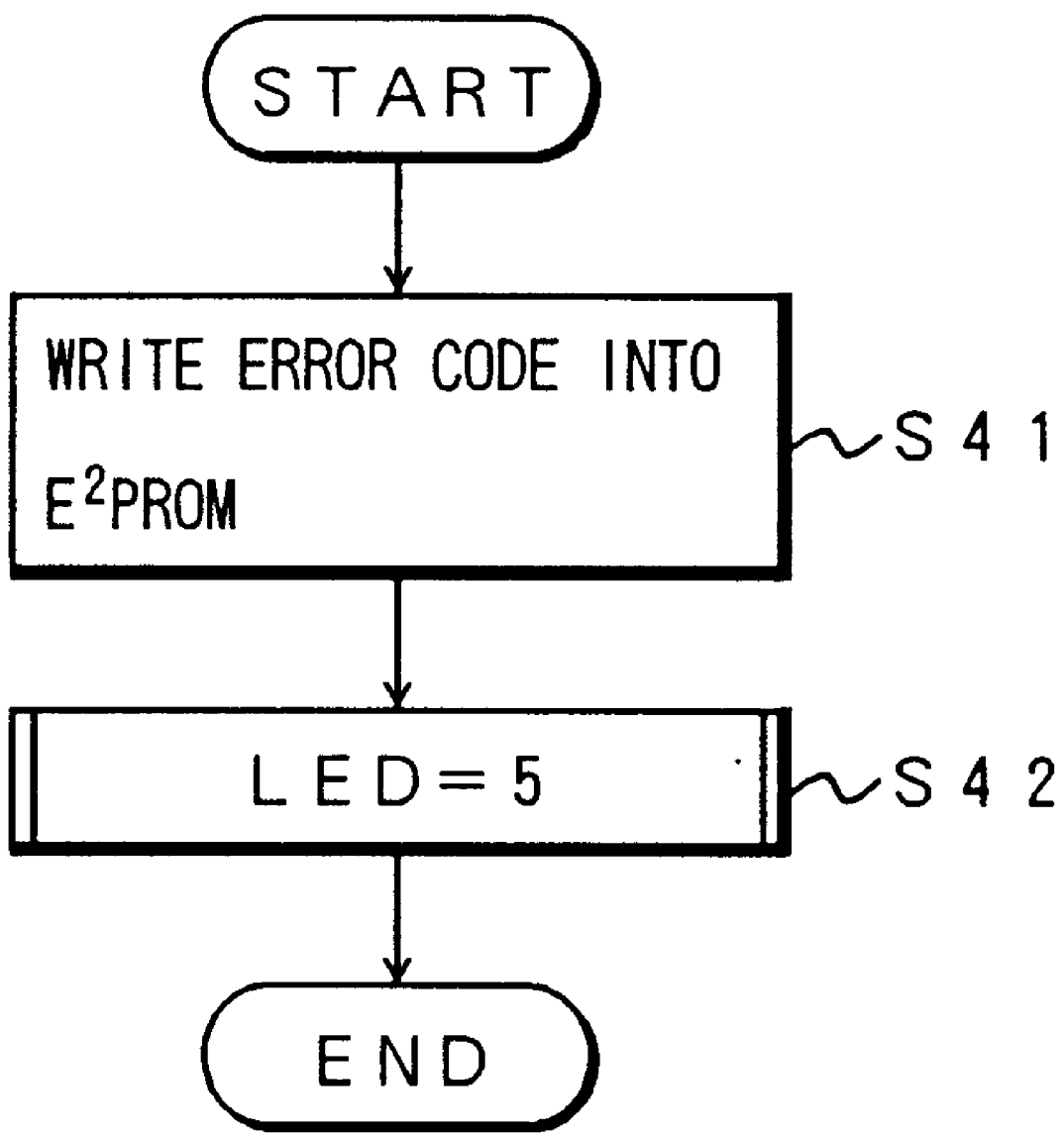
FIG. 13 is a flow chart for explaining an operation of the camera.

FIG. 13 shows a routine of the error processing. In the ROM 28 within the control unit 26, error codes and error sub-codes corresponding to assumed errors and their contents are stored. From the ROM 28, the control unit 26 reads out the error code and/or error sub-code for the error generated within the camera CA and writes thus read-out error code and/or error sub-code into the error-code memory 35 (S41). Namely, when it is judged that the light quantity is insufficient for photographing, the control unit 26 reads out the error code and/or error sub-code based on this information from the ROM 28 and writes thus read-out code and/or sub-code into the error-code $E^2$PROM 35. Then, it performs the operation indicated by LED=5 in FIG. 14. Namely, the control unit 26 causes the three LEDs 14, 15, and 16 to simultaneously flicker as shown in FIG. 15F (S42). Here, the error-code memory 35 has a region for writing the error codes and a region for writing the error sub-code.

In the error mode, no operations can be performed except for the actuating and shutting down operations for the instruments effected by the main switch 10 and the operation for reading out image data from the main memory 34 effected by the host computer H. Though the camera is released from the error mode when reactuated, it is preferable for the camera to be brought to its service center when photographing is impossible for the present due to failure of the instruments and the like. As the error code of the camera is stored in the $E^2$PROM 35, when the host computer H is connected to the camera so as to read out the error code stored in the $E^2$PROM 35, the error code can be shown on the display of the host computer H, whereby the user can see the contents of the error. Namely, a floppy disk FD stores not only a program to be installed into the host computer H but also a program for effecting the white balance adjustment, gamma correction, edge enhancement, and contrast adjustment of the image data read out from the main memory 34, as well as a program including an instruction for causing the display D to show the error code read out from the $E^2$PROM 35 or a self-extract program thereof.

Though the foregoing explanation relates to a case where a sufficient light quantity is not measured by the exposure meter 40, a sufficient light quantity is normally measured by the exposure meter 40. In this case, after adjusting the stop 29, the control unit 26 subjects the signal output from the image sensor 30 to the above-mentioned processing so as to temporarily store the image data into the frame memory 33. After the image data are stored in the frame memory 33, the control unit 26 transfers the image data from the frame memory 33 to the main memory 34. During a processing within the camera such as transferring of the image data, the yellow LED 15 is caused to continuously emit light according to an order from the control unit 26 (S8). At this data-writing operation with respect to the main memory 34, the control unit 26 checks errors in the transferred image data. When an error is detected at the time of data-writing, the above-mentioned error processing is effected (S11).

When the erase switch 11 is pushed down at the judging step 5 (S5), an erase processing is effected (S13). The erase processing is a processing in which the image data stored within the main memory 34 are erased according to an order from the control unit 26. Since the erase processing is a processing within the camera as in the case of the photographing processing, during this processing, according to an order from the control unit 26, the yellow LED 15 is caused to continuously emit light as shown in FIG. 15G (S12). Also, when an error is detected at the error-generation judging step (S14) at the time of erase processing, the above-mentioned error processing is effected (S15). Namely, while a predetermined program voltage is applied to the main memory 34, the latter itself has therewithin a voltage-judging circuit (not depicted) for detecting the former. When the predetermined program voltage is not applied at the time of erase processing; based on this information output from the voltage-judging circuit within the main memory 34, the control unit 26 reads out from the ROM 28 the error code corresponding to this information and writes thus read-out error code into the E$^2$PROM 35, thereby simultaneously flickering the three LEDs 14, 15, and 16.

Since the camera of the present invention causes the LEDs to emit light in response to the number of shots which can be photographed, the user can instantly recognize the state of the camera. Also, when the error code is written into a memory, the error information can be seen. Due to the use of such LEDs and the writing of the error code into the memory, not only the number of items in the camera can be remarkably reduced as compared with the conventional camera using LCD but also the ratio of occupation of the control unit can be lowered, thereby instantaneously notifying the user of necessary information. Further, since the number of items can be reduced, a small-size camera can be provided.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 033858/1996 filed on Feb. 21, 1996 is hereby incorporated by reference.

What is claimed is:

1. A camera comprising:

a housing having an outer surface;

a storage device which can store a predetermined amount of image data, said image data being arranged in blocks corresponding to camera shot;

a light-emitting diode which emits visible radiation, wherein said light-emitting diode is arranged on said outer surface of said housing; and a control unit which, based on information about an available image data storage space on said storage device, controls said visible radiation emitted by said light-emitting diode such that said light-emitting diode emits a number of pulses of visible radiation in a predetermined period, said number of pulses representing a number of available blocks that may be stored in said storage device when said number of available blocks is one, two, or three.

2. A camera according to claim 1, wherein said light-emitting diode is a first light-emitting diode and said camera further comprises:

a second and third light-emitting diodes arranged on said outer surface of said housing, said first, second, and third light-emitting diodes emitting visible radiation having colors of red, green, and yellow, respectively.

* * * * *